Jan. 3, 1933.  J. R. GAMMETER  1,892,942
VULCANIZING PRESS
Filed March 23, 1928  3 Sheets-Sheet 2
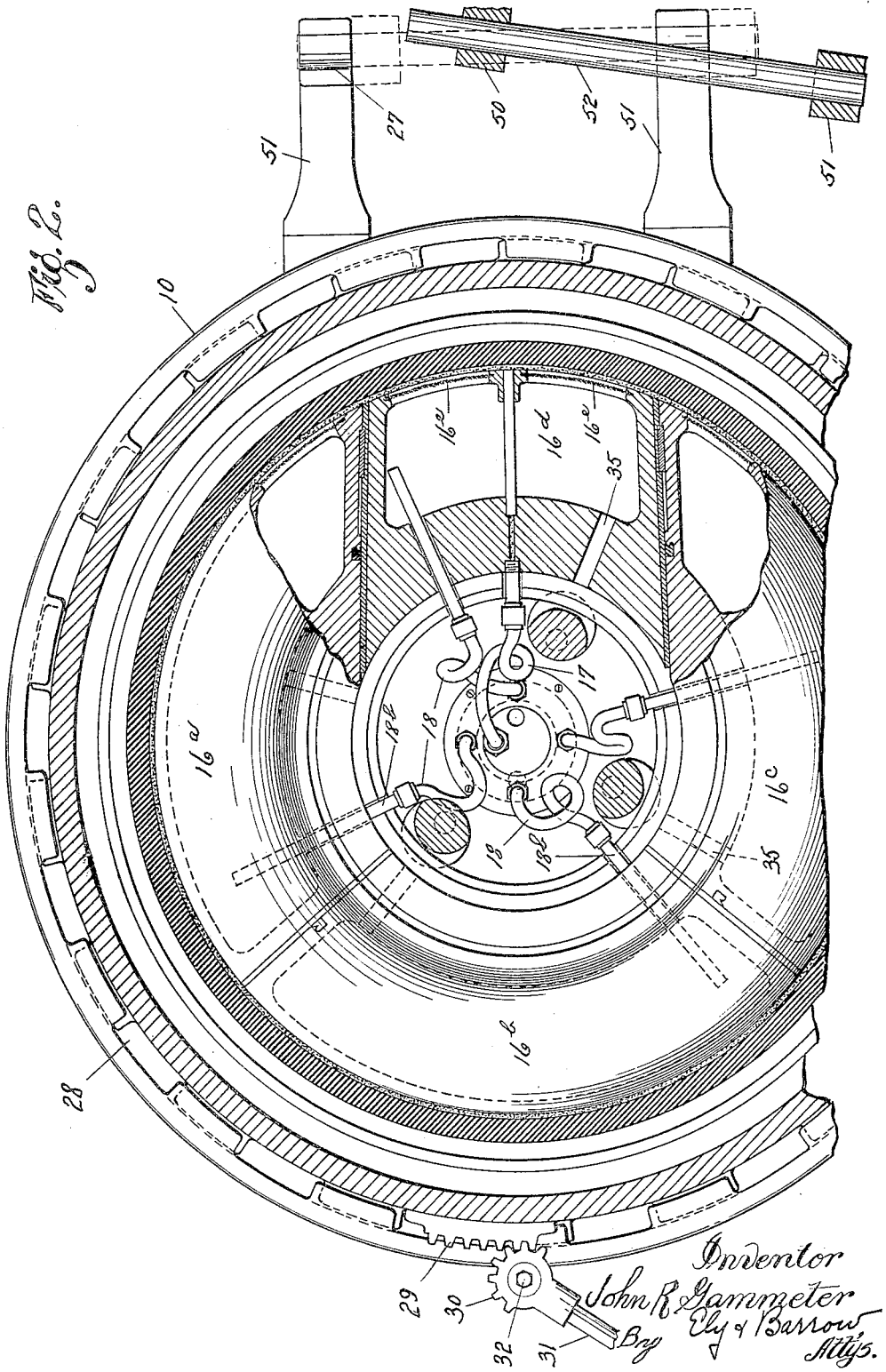

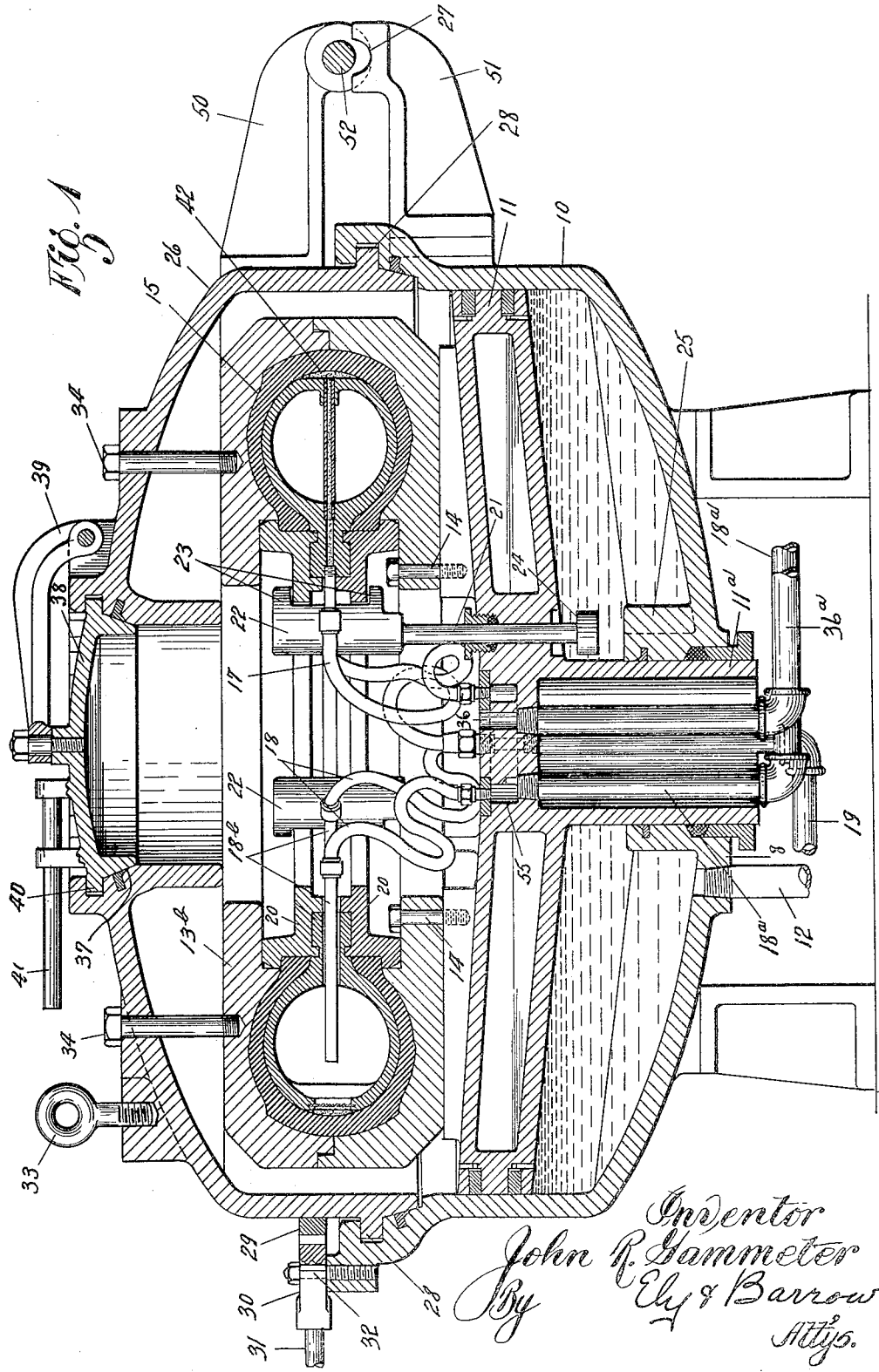

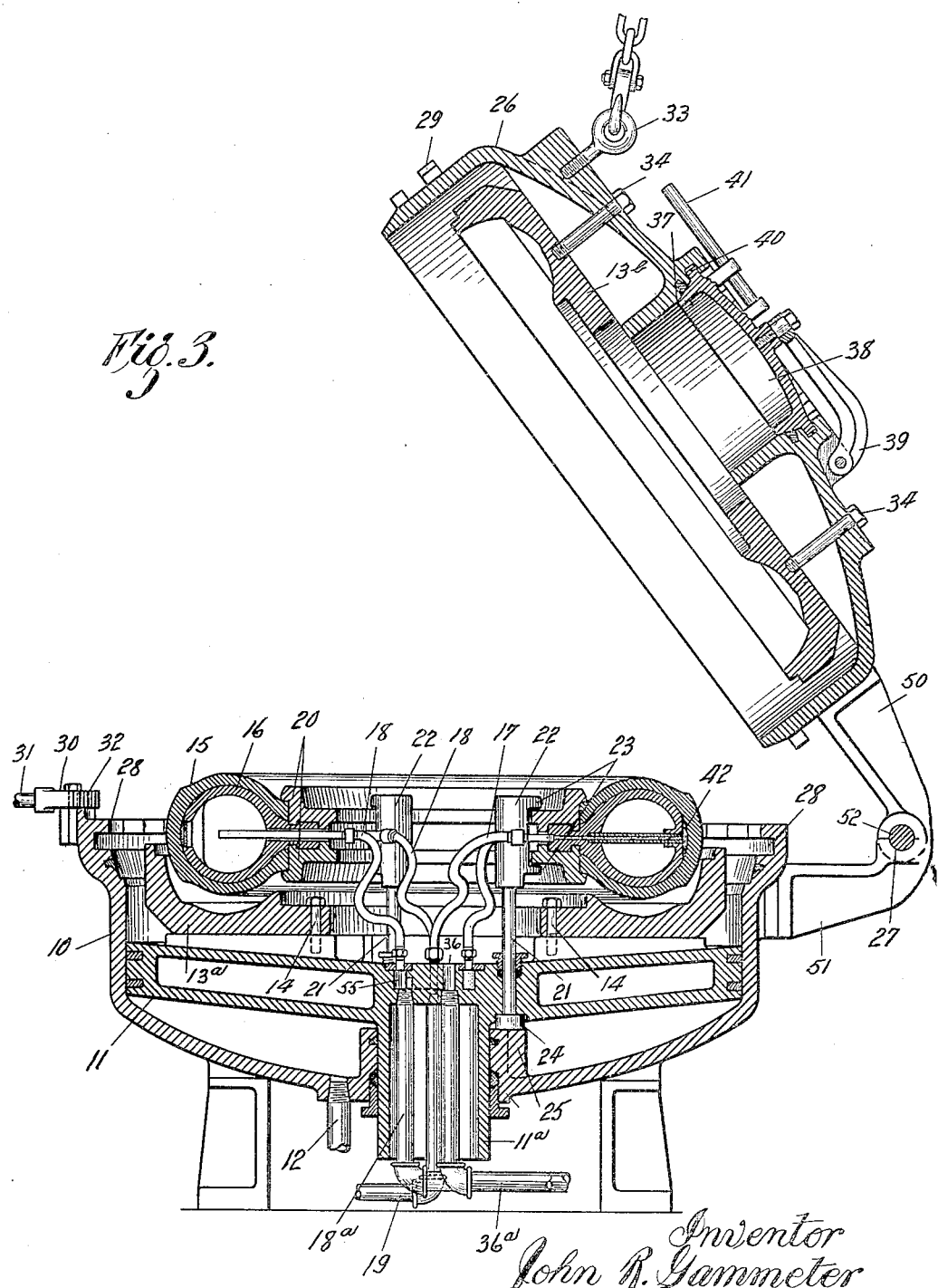

Patented Jan. 3, 1933

1,892,942

UNITED STATES PATENT OFFICE

JOHN R. GAMMETER, OF AKRON, OHIO, ASSIGNOR TO NATIONAL RUBBER MACHINERY COMPANY, OF AKRON, OHIO, A CORPORATION OF OHIO

VULCANIZING PRESS

Application filed March 23, 1928. Serial No. 263,999.

This invention relates to vulcanizing presses of the autoclave type for tires or the like.

Heretofore, autoclave presses have been designed to removably receive stacks of tire or other molds requiring considerable handling and considerable re-heating due to cooling between vulcanizing operations, and the use of which has been limited to large factories with huge and expensive mold handling conveyors.

Jacketed mold vulcanizers, either of the vertical or hinged section type, have recently been to some extent replacing the autoclave press of the above type, even in the larger factories, but many of the advantages of the autoclave type of press, including simplicity of mold construction and effective and uniform distribution of heat and pressure are not attained in the jacketed mold types of presses.

The chief object of the invention is to provide an improved autoclave press unit in which the sections of a mold are secured for repeated vulcanizing operations and which are therefore maintained at or near temperature of vulcanization at all times.

A further object of the invention is to provide in such a press, means for effectively ejecting the vulcanized article from the mold at the end of a curing operation.

The foregoing and other objects of the invention are attained in the press construction illustrated in the accompanying drawings and described below. It is to be understood that the invention is not limited to the particular form or application thereof shown and described.

Of the accompanying drawings:

Figure 1 is a vertical, diametral section through a heater embodying the invention;

Figure 2 is a section on line 2—2 of Figure 1, the vulcanizing core in the tire being shown partly in section and partly in elevation; and Figure 3 is a similar section to that illustrated in Figure 1, but reduced in size and showing the heater opened, ready for removal of the vulcanized tire.

Referring to the drawings, the numeral 10 designates a pot having reciprocably mounted therein a ram 11 operable hydraulically, preferably by hot water at vulcanizing temperature, introduced and drained as desired through a connection 12. Ram 11 is guided in its movement by the wall of pot 10 and also by a hollow central plunger $11^a$ extending through a stuffing box 8 in the bottom of pot 10.

Mounted on ram 11 in pot 10 is a lower mold section $13^a$ which may be removably secured thereon to permit substitutions of molds of different sizes, by means of bolts 14, 14. A tire mold is shown herein, but it will be apparent that other forms of molds may be substituted therefor.

The tire shown at 15 is mounted over a suitable core 16 whereby it may be expanded in the mold while being cured, the particular core shown being sectional and adapted to employ what has been termed the "clay blow" method of expanding the tire. For the purpose of admitting the fluid or plastic clay to the outer surface of the core, there is provided a single flexible connection 17 to one of the core sections. The clay under pressure is supplied to the connection 17 from piping 19 carried by and extending down through the central plunger $11^a$ and connected to a source of clay under pressure.

Bead molding rings 20, 20 are employed to support core 16 and to mold the beads during vulcanization, these rings cooperating with the mold surfaces in the usual manner. Ejector elements 21, 21, comprising rotatable rods extending down through the ram 11, are provided with heads 22, 22 having spaced lugs 23, 23 thereon adapted to be rotated so as to embrace the bead molding rings 20. The lower ends of rods 21 are formed with enlarged heads 24, 24 engageable with abutments indicated at 25 on the bottom of pot 10 when the ram 11 is lowered so that as the ram, carrying the tire assembly, is lowered the heads 24 will elevate the tire and curing rings out of the lower mold section, as shown in Figure 3. When an unvulcanized tire is to be placed in the vulcanizer, it may be seated on the heads 22, and is supported in this position until the lower half of the mold is again elevated.

Pot 10 is provided with a closure or lid 26 having arms 50 thereon adapted to project over arms 51 on the lower part of the vulcanizer. The arms 50 carry a transverse shaft 52 which, when the lid is to be raised, are located over semi-circular seats 27 in the ends of the arms 51. When the lid is closed, the shaft 52 lifts off said seats, as shown in Figure 1, whereby the lid is capable of rotation on said pot to permit securing the lid to the pot by the bayonet joints indicated at 28. Suitable means may be provided to rotate the lid to lock and unlock the vulcanizer, a rack 29 being shown mounted thereon and a sector gear 30 being pivoted on the pot at 32, said sector gear being adapted to mesh with said rack and being provided with an operating lever 31. Lid 26 is preferably arranged to be lifted and lowered by a chain hoist engaged with an eye 33 secured in the lid. The upper mold section $13^b$ is secured to the under side of the lid by bolts 34, 34.

Steam, hot air, or other curing medium may be supplied directly to pot 10. When using the device, however, in the practice of the clay blow method, it is preferable to supply steam to the heater through pipe $18^a$ extending up through plunger $11^a$ and connected to a chamber 55 in the plunger. Flexible connections 18 lead from the chamber 55 to pipes $18^b$, $18^b$, discharging into the several core sections $16^a$, $16^b$, $16^c$ and $16^d$, from which the steam can flow into pot 10 through suitable apertures such as indicated at 35, 35. The steam, hot air, or other curing medium thus circulates through the core and into the pot, so that the mold is entirely surrounded by the medium. In this manner a thorough and effective cure is obtained, the heat being applied to the inner and outer surfaces of the tire. A drain outlet 36, connected to a drain pipe $36^a$, is carried by the plunger $11^a$. The pipe $36^a$ is provided with the usual valve, not shown.

In order to permit access to the interior of the vulcanizer, to make the connections for the steam and clay lines and for any other purpose, the lid 26 has an opening 37 in the top thereof in which is a closure 38 swiveled on a hinge 39 and having a bayonet locking joint with the lid at 40. A handle 41 on the closure 38 serves to rotate the closure and to lift it.

In use, the device is arranged to receive a tire, with the rods standing in the position shown in Figure 3. The tire 15 mounted on core 16 and clamped thereon by rings 20 is mounted on the rods which are rotated so that the lugs face outwardly. The lid is then closed and the ram is elevated to bring the two halves of the mold together, which lifts the ejector rods from their seats.

The steam or other curing medium and the clay expanding medium are then supplied to the core 16, the clay indicated at 42 passing about the core and pressing the tire against the walls thereof and the steam entering the core and heating the tire from within and also passing from the core into the pot about the outer surfaces of the mold. The clay and steam pressure are maintained, the former to produce the required pressure and the latter to maintain the desired temperature throughout the core. The water in the clay is expressed therefrom and drains through the screens, indicated at $16^e$, into the core sections.

When the cure is completed the clay and steam pressure are cut off. The hydraulic pressure against the ram is then relieved and the steam pressure within the pot forces the ram downwardly, ejecting the water from the lower half of the vulcanizer. As the ram lowers the under surface thereof strikes the heads 24 and strips the tire from the upper half of the mold. As the ram 11 continues its descent, the ejector rods 21 engage the abutments 25 and lift the tire out of the lower section $13^a$ of the mold. The heater is blown off by opening the drain $36^a$ and raising the top 38, or both. When the lid is raised, the tire is elevated on the rods and can be removed therefrom. As the lid rises, the shaft 52 seats at 27 and the lid rocks upon the shaft.

The heater is then ready for a succeeding vulcanizing operation and, as will be apparent, it and the molds retain considerable heat therein which renders the operation of the heater very economical. As a further heating medium, hot water may be used for operating ram 11.

It will be apparent from the foregoing that a heating apparatus has been devised in which the advantages of both the autoclave and jacketed mold types of heaters have been secured in a simple and effective manner. It will be observed that the steam or other heating medium is allowed to circulate about the mold which is spaced from the sides of the pot for this purpose.

Modifications may be resorted to without departing from the spirit thereof or the scope of the appended claims. The invention is not necessarily limited to the so-called "clay blow" method, as other standard methods of vulcanization may be carried out therein, with appropriate changes in the mold and tire assembly, as will be understood by those skilled in this art.

What is claimed is:—

1. An autoclave press including a pot, a ram reciprocable in the pot, a lid adapted to be releasably locked on the pot, a lower tire mold section on the ram, an upper tire mold section on the lid, said sections being adapted to be pressed together between the ram and lid, said ram carrying rotatable rods formed at their upper ends to be rotated into engagement with a portion of the mounting on which the tire is vulcanized, and abutments in the pot for engaging said rods when the ram is lowered to separate the tire from the lower mold section.

2. An autoclave press including a pot having a lid, a ram reciprocable in the pot, said ram and lid carrying cooperating tire mold sections adapted to receive a tire and a mounting therefor including bead molding rings, and elements carried by the ram adapted to be engaged with the bead molding rings and operable by the ram against abutments in the pot as the ram is lowered to eject the tire and its mounting from the mold.

3. Apparatus for vulcanizing tires comprising a pot having a lid adapted to be locked thereto, a ram in the pot movable toward and from the lid, said ram and said lid carrying mating tire mold sections, a hollow core on which the tire to be vulcanized is mounted, means for introducing a fluid tire expanding medium about a core in a tire enclosed in a mold in said pot, and means for introducing a fluid heating medium into said core and into the pot about the mold.

4. Apparatus for vulcanizing tires comprising a pot having a lid hingedly mounted thereon and adapted to be locked thereto, a ram in the pot movable toward and from the lid, said ram and said lid carrying mating tire mold sections, a hollow core on which the tire to be vulcanized is mounted, means for introducing a fluid tire expanding medium about a core in a tire enclosed in a mold in said pot, and means for introducing a fluid heating medium into the pot about the mold.

5. Apparatus for vulcanizing tires comprising a pot having a lid hingedly mounted thereon and adapted to be locked thereto, a ram in the pot movable toward and from the lid, said ram and said lid carrying mating tire mold sections, means for expanding a tire enclosed in a mold in said pot, and means for introducing a curing medium into the pot.

6. An autoclave press comprising a pot, a lid hingedly mounted thereon and adapted to be releasably locked to the pot, a ram in the pot movable toward and from the lid, said ram and lid carrying mating mold sections, means for supplying steam to the pot, and a drain for blowing off steam and condensate from the pot, said lid having means thereon for finally blowing off steam from the pot prior to opening the lid.

7. A vulcanizer comprising a pot and a closure, a divided mold, one section of the mold being carried by the closure, a ram within the pot, the other section of the mold being carried by the ram, means to supply pressure to the ram to force the mold sections together when the vulcanizer is closed, and ejectors for stripping the tire from the upper and lower sections of the mold, said ejectors being operable by movement of the ram away from the lid.

8. A vulcanzier comprising a pot and a closure, a sectional mold, one section thereof carried by the closure, a ram within the pot, the other section of the mold being carried by the ram, the mold being adapted to receive a tire mounted upon bead rings, and ejector rods engaging the bead rings, said rods stripping the tire from the mold sections as the ram is operated.

9. A vulcanizer comprising a pot and a closure for the pot, a sectional mold within the pot, one section of said mold being carried by the closure, a ram within the pot, the other section of the mold being carried by the ram, rods carried by the ram and having a limited movement in the ram, and lugs on the rods adapted to engage a portion of a tire assembly, the rods being actuated by movement of the ram to strip the tire from both sections of the mold.

10. A vulcanizer comprising a pot, a lid over the pot, a shaft carried by the lid, a seat on the pot to receive the shaft and about which the shaft may rotate in the opening and closing of the lid, means to rotate the lid when the shaft is removed from the seat, and locking devices operable upon rotation of the lid.

11. A vulcanizer comprising a pot and a lid, a sectional mold within the pot, the mold being spaced from the pot and the lid about its entire outer surface, means for introducing a heating medium within the pot, a ram in the pot operable to close the mold, one section of the mold being carried by the ram and the other by the lid, and means for separating the contents of the mold from the walls thereof upon operation of the ram away from the lid.

12. A vulcanizing apparatus for curing tires under internal pressure, comprising a pot, a lid on the pot, a sectional mold within the pot, a ram within the pot, one section of the mold being carried by the lid and the other section by the ram, and flexible connections carried by the ram, said connections comprising conduits for pressure for expanding the tire and for a heating medium, said conduits delivering in the interior of the tire, and a passageway for the heating medium from the interior of the tire communicating with the interior of the pot.

JOHN R. GAMMETER.